June 9, 1964
J. A. DENLINGER
3,136,683
METHOD OF PRODUCING CERAMIC ACOUSTICAL
PRODUCT HAVING IMPROVED FIRED STRENGTH
Filed Oct. 31, 1961
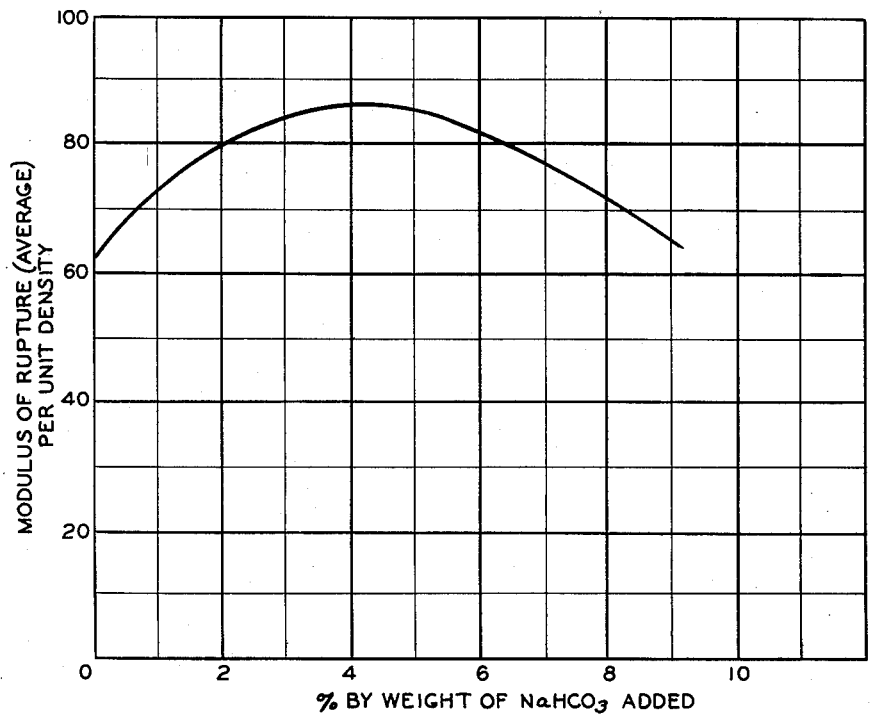
*INVENTOR.*
JOHN ARTHUR DENLINGER
BY

United States Patent Office 3,136,683
Patented June 9, 1964

3,136,683
METHOD OF PRODUCING CERAMIC ACOUS-TICAL PRODUCT HAVING IMPROVED FIRED STRENGTH
John A. Denlinger, Mountville, Pa., assignor to Armstrong Cork Company, Lancaster, Pa., a corporation of Pennsylvania
Filed Oct. 31, 1961, Ser. No. 149,035
4 Claims. (Cl. 162—152)

This invention relates to a method of making a ceramic acoustical board product having improved fired strength and more particularly relates to a method of making a white ceramic acoustical board product from an aqueous slurry of mineral wool and a clay having the characteristics of Mississippi M & D clay wherein the strength of the fired product is considerably improved.

The present invention is related to the co-pending application of James C. Ollinger, Serial No. 148,877, filed October 31, 1961, entitled "Ceramic Acoustical Product and Method of Making Same." In that application, there is disclosed a board product of low density firmly bonded throughout by means of a ceramic bond, the board being white in color and having exceptional acoustical properties. The board is initially formed on conventional board forming equipment from an aqueous slurry consisting essentially of water, a clay, having the characteristics of Mississippi M & D clay, and mineral wool. In forming the board product, the slurry is deposited onto a board forming screen, pressed to the desired thickness and dried to give the board handling properties, after which it is dried to remove the water and then fired at a temperature in the range of from about 1000–1500° F. The firing is continued for an amount of time sufficient to achieve a firm ceramic bond throughout the board product, the temperatures being such that the resulting board is a light colored or white board particularly well adapted for use as acoustical ceiling tile.

I have discovered that the fired strength of the boards produced in accordance with the method described in the above-identified application can be considerably enhanced by adding limited amounts of sodium bicarbonate to the slurry mixture of Mississippi M & D clay, mineral wool, and water prior to forming a board therefrom. The addition of sodium bicarbonate is effective in increasing the fired strength per unit density of the material. This is more fully illustrated in the drawing wherein a graphed curve is plotted showing the modulus of rupture, a measure of the effective fired strength, per unit density versus percent addition of sodium bicarbonate. Generally speaking, the amount of sodium bicarbonate added to the slurry is preferably from 2–6% by weight of sodium bicarbonate, based on the total weight of the slurry solids, although appreciable increase in fired strength is realized when from about .5–9% by weight of sodium bicarbonate is utilized.

The board products produced in accordance with this invention are formed from slurries consisting essentially of water, mineral wool and a natural ball clay having the characteristics of Mississippi M & D clay. In forming the board products the solids in the slurry are adjusted so that there is retained in the board, on formation on the usual board forming screen, from 20 to 32% by weight of clay and from 68 to 80% by weight of mineral wool based on the total weight of the solids. The sodium bicarbonate is added within the preferred percentage range, based on the total solids present in the slurry, to the prepared slurry of wool, clay and water.

Any of the various varieties of mineral wool may be used in the practice of this invention and board products having particularly good acoustical and physical properties are formed using iron blast furnace slag wool or phosphate slag wool. After the board is dried it is fired at a temperature in the range of from about 1000–1500° F. for a length of time sufficient to develop a strong ceramic bond throughout the product. With a board 1" in thickness and at a temperature of about 1300° F., a firing time of about 10 minutes insures the development of a good ceramic bond. At lower temperatures and for thicker boards more time is necessary, a 2" board, for example, requiring a firing time of about 20 minutes at 1300° F. With iron blast furnace slag wool the firing temperature is preferably from 1000–1400° F. and with phosphate slag wool the temperature is preferably from 1100–1500° F.

The following examples will serve to more fully illustrate the invention:

*Example 1*

A board making slurry is made up by mixing in a planetary mixer, 8.3 pounds of water, 1.2 pounds of Mississippi M & D clay, 0.11 pound of sodium bicarbonate, and 1.6 pounds of iron blast furnace slag wool.

After the slurry is sufficiently well mixed, it is metered onto a board forming screen at a rate such as to form about a 1" thick sheet. The sheet is passed beneath compression rolls and over a vacum to give it the desired final 1" thickness and to reduce the water content to about 62% by weight of the board, at which point the board product is handleable. The sheet containing 62% by weight of water contains 29% by weight of clay based on the weight of the solids. The sheet is then passed through a 3-stage drier to remove the remainder of the water after which it is fired for 10 minutes at 1300° F.

The fired board product has a density ranging from 2.02–2.30 pounds per board foot and a modulus of rupture averaging 186 p.s.i., with a range for the modulus of rupture of from 146–222 p.s.i. The noise reduction coefficient of the finished board is 0.63. The product is dimensionally stable, sag resistant, and noncombustible.

In order to contrast the fired strength of the product containing the sodium bicarbonate additive, the following example will illustrate a board made in the same way except for the omission of the sodium bicarbonate in the board making slurry.

*Example 2*

A board making slurry was prepared by mixing, for 3 minutes in a planetary mixer, 8.3 pounds of water, 1.2 pounds of Mississippi M & D clay, and 1.6 pounds of iron blast furnace slag wool. The slurry was evenly distributed onto a board making screen and suction was applied to reduce the content of water to 59–62% by weight of the board. During the drainage of the water, although clay was removed along with the water, the clay remaining in the board was of the same clay to water ratio as was in the original slurry. The drained sheet contained 27–29% by weight of clay and weighed 2.18–2.26 pounds per board foot when dried.

The sheet thus prepared was fired for 10 minutes at 1300° F. and the resultant board, 1" in thickness, had a density of 2.25–2.39 pounds per board foot. Measurements were made to determine the modulus of rupture of the board product thus formed and the board had an average modulus of rupture of 135 p.s.i. with a range of modulus of rupture of from 124–149 p.s.i. The board had a noise reduction coefficient of 0.62.

As is clearly illustrated by the above two examples, the addition of sodium bicarbonate to the board making slurry resulted in an average increase in modulus of rupture of the fired product of 51 p.s.i., or an average increase of 38% in fired strength.

To more fully illustrate the advantages achieved by the addition of sodium bicarbonate to a board making slurry, a series of boards was made up from a slurry containing 70% by weight of the total solids of iron blast furnace slag wool, 30% by weight of the total solids of Mississippi M & D clay, and 72% by weight of the slurry of water. Sodium bicarbonate was added to the above-described slurry in varying amounts over a range of from 0–10% by weight of the slurry solids. The slurries thus prepared were troweled onto a perforated screen, dried to remove the water, and fired at 1200° F. for 10 minutes to form the ceramic board products. The modulus of rupture per unit density of the board product thus prepared was determined and the average modulus of rupture per unit density measured in pounds per square inch per pound per board foot was plotted against the percent addition of sodium bicarbonate. This graph is reproduced in the drawing.

The reason for the improvements in the physical characteristics resulting from practice of this invention is not fully understood, but one theory is that the sodium bicarbonate apparently acts as a base to neutralize the slightly acidic Mississippi M & D clay and as an acid in solution to partially etch the mineral wool fibers to yield improved adherence of the clay to the mineral wool. In addition, the sodium which is contained in the sodium bicarbonate apparently acts as a flux to give a better bond between the mineral wool and the M & D clay when the material is being fired.

I claim:

1. In a method of producing a ceramic acoustical board product wherein a board making slurry consisting essentially of water, mineral wool, and Mississippi M & D clay is formed into a board on a board forming screen, dried and fired at a temperature in the range of from about 1000–1500° F. to form a ceramic bond, the improvement which comprises adding from about 0.5% to about 9% by weight of sodium bicarbonate, based on the weight of the slurry solids, to said board making slurry.

2. The method of forming a ceramic acoustical product as defined in claim 1 in which the addition of sodium bicarbonate is in the range of from about 2–6% by weight of the slurry solids.

3. The method of forming a ceramic acoustical product as defined in claim 2 in which the mineral wool is iron blast furnace slag wool and in which the firing temperature is in the range of from about 1000–1400° F.

4. The method of forming a ceramic acoustical board product as defined in claim 2 in which the mineral wool is phosphate slag wool and in which the firing temperature is in the range of from about 1100–1500° F.

References Cited in the file of this patent

UNITED STATES PATENTS

| | | |
|---|---|---|
| 2,731,359 | Nicholson | Jan. 17, 1956 |
| 2,747,994 | Hoopes | May 29, 1956 |
| 3,014,835 | Feigley | Dec. 26, 1961 |
| 3,020,619 | Koch | Feb. 13, 1962 |